June 28, 1955  R. L. LORENZ  2,711,790
PROGRAM INSTRUMENT
Filed Dec. 28, 1951  2 Sheets-Sheet 1
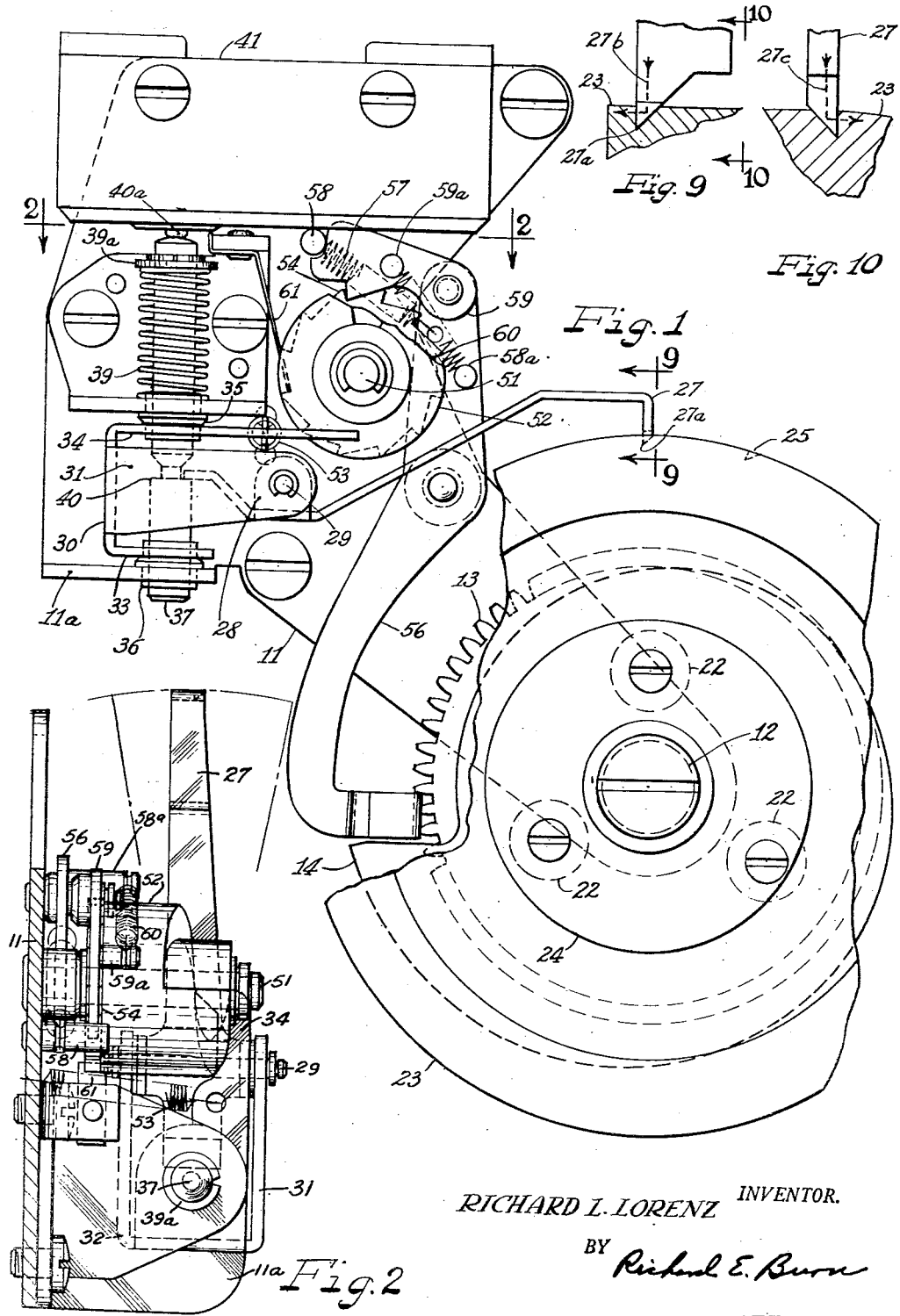
RICHARD L. LORENZ INVENTOR.
BY Richard E. Burn
ATTORNEY June 28, 1955
R. L. LORENZ
2,711,790
PROGRAM INSTRUMENT
Filed Dec. 28, 1951
2 Sheets-Sheet 2
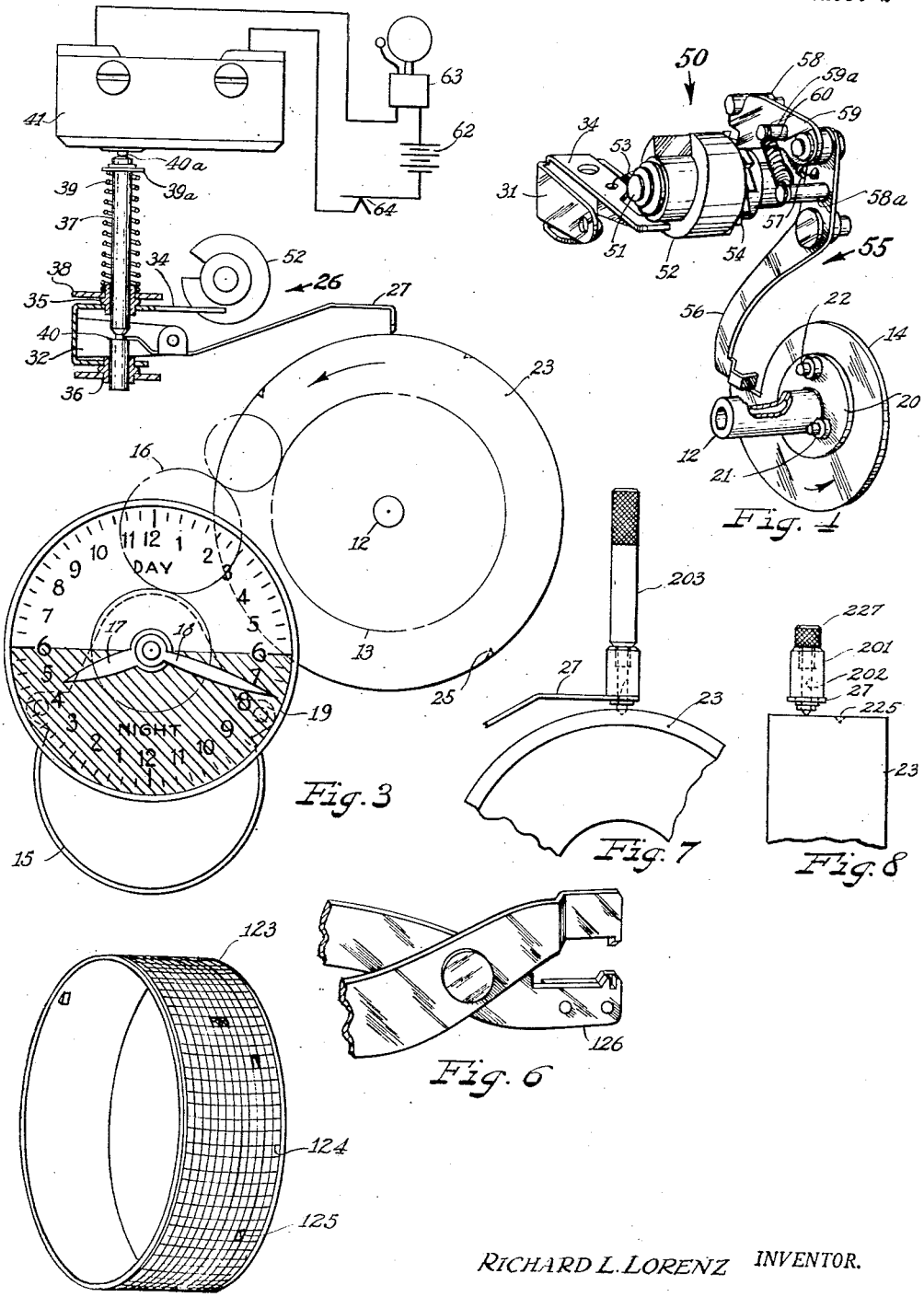
RICHARD L. LORENZ INVENTOR.
BY Richard E. Burn
ATTORNEY

United States Patent Office 2,711,790
Patented June 28, 1955

2,711,790

PROGRAM INSTRUMENT

Richard L. Lorenz, Chicago, Ill., assignor to General Time Corporation, New York, N. Y., a corporation of Delaware Application December 28, 1951, Serial No. 263,943

3 Claims. (Cl. 161—1)

This invention relates to improvements in program instruments and particularly to an improved program instrument, the operation of which is controlled by a small rotating drum.

A program instrument is a device for closing an electrical circuit at a predetermined time. A program instrument may be a self-contained device or a part of a time system which incorporates a secondary mechanism to actuate the program instrument in accordance with the electrical impulses of the time system.

The program instruments known to the prior art have usually been controlled by a punched tape or removable lugs disposed on a drum or disk. In most of the prior art devices, a program instrument which would actuate a signal at one minute intervals over 24 hours would require a large disk, a large drum, or a long tape. The present invention utilizes a small drum which can be controlled and marked in such a manner that any minute of a 24 hour day may be chosen to close a signal circuit. The time schedule on the drum may be imposed in a permanent manner so that difficulty due to the slippage or loosening of removable lugs is avoided.

Another difficulty encountered with prior art devices was in setting up the time program. In most prior art devices, the tape or drum was removed from the device in order to set up the program. Since the minute divisions are usually closely spaced, it was not without difficulty that the proper point for punching a hole in the tape or inserting a lug on the drum was ascertained.

In the present invention, of which the program instrument herein disclosed and described is a preferred embodiment, the program drum need be only approximately 3 inches in diameter. In the preferred type of instrument the desired program is placed on the drum by making a small depression in its periphery. Cooperating with the drum is a follower or feeler that rides on the drum periphery. The drum revolves once in two hours and at the end of each revolution the follower is moved to a new path on the drum. After twelve revolutions or 24 hours, the follower is quickly returned to the original position and the cycle is repeated. In this preferred embodiment the drum need not be removed from the instrument in order to set up the program. The program may be set up by the operator by merely setting the time at which a signal is required on a clock dial to which the program drum is geared, and then placing an indentation on the drum by striking the follower with a small hammer.

One object of this invention is to provide a program instrument which is compact, has few parts, and is simple to manufacture. A further object is to provide a program instrument on which an unskilled operator can set up a program in a very short time with little chance of an error.

A still further object is to provide a program that is adapted to occupy a small space so that it may be housed in chronologically controlled apparatus, such as time recorders, time stamps or clocks and driven by said apparatus.

Another object is to provide in a program device means to permanently record a signal controlling schedule which means may be removed from the device and stored without subjecting said schedule to variations due to loss of lugs, stretching of tapes, etc.

Other objects, advantages, and features of this invention will become apparent as this description proceeds.

With reference now to the attached drawings which form a part of the specification and in which like reference numerals refer to like parts;

Fig. 1 is a side elevational view of a preferred embodiment of the improved program instrument, certain parts being broken away to more clearly show the mechanism;

Fig. 2 is a plan view which is taken on the line of 2—2 of Fig. 1;

Fig. 3 is a schematic view of the program instrument showing one example of an electrical circuit that may be controlled by the program instrument;

Fig. 4 is a perspective view of the ratchet mechanism for actuating the cam;

Fig. 5 is a perspective view of a modified drum construction;

Fig. 6 is a perspective view of a pair of pliers to be used with the drum construction of Fig. 5;

Fig. 7 is an elevational view of a drilling tool to be used with a second modification of the drum construction;

Fig. 8 is an elevational view of the drum construction of Fig. 7 with the follower replacing the drilling tool of Fig. 7;

Fig. 9 is an enlarged view of the feeler point taken on the line 9—9 of Fig. 1;

Fig. 10 is an enlarged view of the feeler point taken on the line 10—10 of Fig. 9.

Referring now to the drawings, and especially to Figs. 1 and 2, the principal structure of the program instrument is mounted on plate 11. Rotatably mounted on plate 11 is the main shaft 12 to which is secured a gear 13 and a cam 14. Gear 13 and with it the shaft 12 and cam 14 are driven counterclockwise, as shown in Fig. 1, at the rate of one revolution every two hours by a synchronous motor 15 through a gear train 16, shown diagrammatically in Fig. 3. Also driven by a portion of the gear train 16 are an hour hand 17 and a minute hand 18 co-operating with a 24 hour dial 19. The gear train 16 includes a friction clutch (not shown) so that the clock hands 17, 18 and the drum 23 may be rotated without rotating the motor.

Secured to cam 14 is a washer 20 having three bosses 21 spaced about its surface. Removably fastened to these bosses by studs 22 is a program drum 23. It will be noted in Fig. 1 that one of the studs 22 is spaced further from the center of shaft 12 than the other two studs. This provides a means for alining the program drum on shaft 12 so that it can be removed and yet when returned, it will always be in the same position.

I prefer to make the program drum 23 of a hard wood, such as maple, although, as will be explained later, a plastic or metal drum may be used. The drum shown in Fig. 1 may be constructed of one piece of maple provided with openings to receive the shaft 12 and studs 22. A metal washer 24 is held in place by studs 22 on the side of the drum to provide equal pressure on the drum from said studs.

In the preferred embodiment the drum 23 may be approximately three inches in diameter and one inch in width. The program is placed on drum 23 by means of depressions 25 which actuate a cooperating follower assembly 26.

The follower assembly 26 includes a follower lever or feeler 27 having a point 27a which rides on the periphery of drum 23. The point 27a is shaped so that it will drop sharply into a depression 25 and then ride out of said depression as the drum continues to revolve. As best shown in Figs. 9 and 10, the point 27a of feeler 27 is created from rectangular stock by grinding a chisel edge in one direction and then grinding a second chisel edge at right angles to the first, leaving a pyramidal point having two sides at right angles to each other. When this point is driven into the surface of the drum, lines of force are generated as shown by the dotted arrows 27b and 27c. Since each slope of the chisel point is backed up by a perpendicular surface, the point enters perpendicularly into the drum and there is no tendency to "crawl" away from the point at which it enters the drum surface. This novel pyramidal point assures proper coincident matching of the depression 25 and the point 27a when the lever 27 acts to "feel" or "sense" the depression 25 in said drum.

The follower lever 27 may be made of one piece of metal bent as shown and provided with an ear 28 on each side of said lever. Ears 28 are pivoted on shaft 29 so that the lever 27 may rotate about shaft 29 in a vertical direction. The ears 28 are positioned about three-fourths of the length of the lever from point 27a with a shorter length of the lever extending beyond the ears to actuate a switch, as will be explained later.

Shaft 29 is mounted on a frame 30 which comprises a single piece of sheet metal bent to form a pair of vertical arms 31, 32 which support shaft 29, and a pair of horizontal arms 33, 34. Horizontal arms 33, 34 are provided with openings containing bearings 35, 36. The bearings 35, 36 are rotatably mounted on a shaft 37 so that the entire frame 30 pivots about shaft 37. Thus it will be seen that follower lever 27 is pivoted for vertical movement on shaft 29 and rotates with frame 30 horizontally about shaft 37.

The lower end of shaft 37 is slidably supported on a bent-up portion 11a of plate 11. Near its mid-point shaft 37 is bolted to plate 11. A compression spring 39 surrounds shaft 37 and pushes upward against a washer 39a secured to the upper end of shaft 37 thus tending to push shaft 37 upward as shown in Figs. 1 and 3. Shaft 37 has a shoulder 40 which co-operates with the short end of follower lever 27. When the point 27a of lever 27 is riding on the periphery of drum 23, the shaft 37 is held in the lower position against the pressure of spring 39. When the point 27a drops into a depression 25 then spring 39 lifts shaft 37 to actuate a plunger 40a of a switch 41 which may be of the type known as a "Micro-Switch." The characteristics of switch 41 are such that the contacts are normally open, but a very small movement of plunger 40a will close said contacts.

As shown in Fig. 1, the center-line of plunger 40a coincides with the center-line of shaft 37 so that the plunger and shaft remain in alinement, although the shaft is free to pivot horizontally. The switch 41 is mounted on plate 11 and may be adjusted on said plate to provide the proper position in relation to shaft 37.

The horizontal movement of the follower lever 27 is controlled by a spiral cam mechanism 50 shown in Fig. 4. A shaft 51 mounted in plate 11 has rotatably mounted thereon a spiral cam 52; cam 52 includes 30 degrees or one-twelfth less than one complete revolution. A spring 53 holds arm 34 against the side of spiral cam 52. Thus the position of cam 52 determines the horizontal position of frame 30 and, in turn, follower lever 27.

A ratchet wheel 54 having 12 teeth is formed on the end of cam 52. Cam 52 is rotated one-twelfth of a revolution for each complete revolution of drum 23 by means of cam 14, linkage 55, and ratchet wheel 54. Linkage 55 includes a follower arm 56 pivoted on plate 11. A spring 57 connects the upper portion of arm 56 to a stop pin 58 mounted in plate 11. Spring 57 tends to rotate arm 56 in a counterclockwise direction. On the upper end of arm 56 is pivoted a pawl 59 which co-operates with ratchet wheel 54. A pawl spring 60 is stretched between a pin 59a on the pawl and a second pin 58a on the follower arm 56. A holding pawl 61 (Fig. 1) prevents the ratchet wheel from turning clockwise.

In Figs. 1 and 4 the follower arm 56 is shown as having just dropped off the cam 14; spring 57 has rotated the follower arm 56 to a position wherein the pawl 59 is against the stop pin 58; and the ratchet wheel has been advanced one-twelfth of a revolution. This has rotated the spiral cam 52 and the cam, in turn, has moved the follower lever 27 laterally one position, ready to start a new track on the drum 23.

Since the spiral cam is moved only at the end of each two hour period, the follower lever point 27a traces or senses a straight line on the surface of drum 23 for two hours. At the end of the two hour period, the follower 56 drops off cam 14 thus advancing the ratchet wheel 54 one tooth and through spiral cam 52 quickly moving the lever 27 over one position on drum 23. The point or feeler 27a will now trace a new line on the drum parallel to the first line. Thus in 24 hours the feeler will trace twelve parallel lines. At the end of twenty-four hours, as the ratchet wheel 54 advances the spiral cam 52, the arm 34 drops off the spiral cam 52 and snaps back to the initial position thus returning the feeler 27a to its first position ready to start a new cycle.

Setting up a program on this program instrument is very simple. The operator first places a fresh drum 23 over shaft 12, securing it by the three studs 22. He then turns the clock hands 17 and 18 to the time at which the first signal is desired. Since the shaft 12 is connected to the clocks hands by gear train 16, the clock hands are always kept synchronized with said shaft and, therefore, the drum 23 and the feeler 27a move in synchronism as the hands are set. With the clock hands set, the point or feeler 27a is now on the correct spot on the drum to give the desired signal. The operator now strikes the follower arm 27 with a small hammer, forcing the point 27a into the wood drum and forming a depression 25. The depression need not be very deep since a very small movement of the plunger 40a will actuate the switch 41. The operator then sets the clock hands to the time for the next signal and repeats the procedure. There is no chance of error in positioning the depression on the drum, if only the clock hands are set correctly. If the operator desires to change the old drum, he places a new drum over shaft 12 and repeats the procedure. The drum containing the old program can be stored away in case the old program is desired in the future.

In Fig. 3 the program is shown with the switch 41 connected to a typical signal circuit including a battery 62 and a bell 63. The contacts 64 represent a conventional time delay relay that will open the circuit after the bell 63 has rung for the desired interval.

Although the wooden drum 23 has been found most satisfactory, drums of other materials may be used with this invention. In Fig. 5 is shown a hollow drum 123 that may be made of brass, aluminum or other soft metal. This drum may be positioned in the program instrument by the use of conventional pillars secured to the bosses 22. However, I find that setting up the program by tapping the feeler point 27a into the metal drum may not be satisfactory because this procedure sometimes forces metal out of the depression and above the surface of the drum where it interferes with relative movement between the drum and the follower. I, therefore, prefer to place indicia 124 on the drum so that the program can be placed on the drum when it is removed from the program instrument. Special pliers 126 may be used to punch a retangular depression 125 in the drum for each signal (see Fig. 6).

As shown in Figs. 7 and 8, I have also provided a means for drilling a depression in the drum surface. This may be used for metal or plastic drums. As shown in Fig. 8, the bent end of the follower arm 27 is cut off and a hole is drilled in the horizontal portion of said arm. A cylindrical member 201 is secured to the arm 27. The cylindrical member has drilled in it a longitudinal passage 202 which is threaded at the upper end. A feeler pin 227 extends through said passage and screws into said threaded portion while the lower pointed end extends below the follower arm 27 and in contact with the drum. In order to drill a depression 225 in the drum surface, the feeler pin 227 is unscrewed and lifted from the member 201. A drill 203 is then placed in the cylindrical member and turned a few revolutions with the fingers. The end of the drill is so cut that it drills a conical depression in the drum removing a portion of the drum so that no material is raised above the surface of the drum. The location of each depression is found by merely setting the clock hands 17 and 18, as explained for the first embodiment, and then striking the follower to provide a spot depression for the subsequent drilling. When all the depressions have been drilled, the drill 203 is removed, the feeler pin 227 is tightly screwed into member 201, and the device is ready to operate as soon as it is connected in the signal circuit and power is supplied to the motor 15.

I have found that any of the drums described operate with no appreciable wear even after operating them in tests equivalent to many years of use. The pressure needed to operate the switch 41 is so light that the feeler points 27a or 227 do not scratch the drum surface sufficiently to interfere with the operation of the instrument.

While I prefer the embodiments disclosed in the drawing, it is also possible to design a program to be operated by small special tacks or pins, preferably with substantially square heads driven into the drum 23 instead of by depressions 25. In this design, switch 41 is changed to one in which the contacts are biased to closed position. The feeler point 27a is then adjusted so that pressure is maintained on the plunger 40 by spring 39 when feeler point 27a is riding on the periphery of the drum. When the feeler point strikes a tack head it is lifted, thereby depressing the shaft 37 and allowing the contacts in switch 41 to close. In this type of program instrument the program is set by striking the follower lever 27 to make a depression in the drum and then driving a tack in said depression for each signal point. This operation can be carried out with the drum on the shaft 12 so that each tack is placed correctly and there need be no indicia to represent minutes on the drum.

While I have described my invention as being continuously driven by a synchronous motor, it will be understood that any type of time drive may be connected to the instrument that will drive the clock hands and the drum at the correct speed in continuous or intermittent movement on its axis. An impulse type clock movement or spring driven clock works are satisfactory as the device requires very little power.

Although I have described only the preferred embodiment of my invention, it will be understood that modifications may be made without departing from the spirit of my invention. The above description is meant to be illustrative only, and my invention is to be limited only by the appended claims.

I claim:

1. A program instrument comprising a rotatable drum having feeler actuating means in predetermined positions on its periphery; a pivoted lever having a feeler co-operating with the periphery of said drum; a frame pivotally mounting said lever for movement of said feeler toward and from the axis of said drum; a slidable shaft supporting said frame for oscillation in a plane at right angles to the plane of said feeler movement, the end of said lever opposite said feeler co-operating with said slidable shaft to slide said shaft each time the feeler is moved by the feeler actuating means on said drum, a switch actuated by said slidable shaft; and means to oscillate said frame in synchronism with the rotation of said drum so that said feeler is made to sense a predetermined path on said drum periphery.

2. A program device comprising a drum rotatable at a timed rate, said drum having a surface capable of receiving a depression when struck by a pointed instrument; a feeler lever cooperating with the surface of said drum and adapted to be actuated by a depression in said surface, said feeler lever having a pyramidal point adapted to place a depression in said drum surface when struck against said surface and then sense said depression in said drum, and means to actuate a switch by movement of said feeler lever when it senses said depression.

3. A program instrument comprising a horizontally pivoted rotatable drum having feeler actuators on its periphery, means for revolving said drum at constant speed in predetermined relationship with the time of day, a feeler for sensing the periphery of said drum pivoted for vertical movement by said feeler actuators, a frame for said feeler pivoted for horizontal oscillation, means operated by said revolving means for oscillating said frame in synchronism with the rotation of said drum so that said feeler senses the periphery of said drum in a predetermined path, a vertically reciprocable shaft about which said frame is pivoted, said shaft being reciprocated by vertical movement of said feeler, and circuit closing means actuated by said shaft.

References Cited in the file of this patent

UNITED STATES PATENTS

| 1,472,743 | Blair | Oct. 30, 1923 |
| 1,998,435 | Battegay | Apr. 23, 1935 |
| 2,075,592 | Speir | Mar. 30, 1937 |
| 2,172,623 | Pitney | Sept. 12, 1939 |
| 2,214,534 | Maxwell | Sept. 10, 1940 |
| 2,497,142 | Shepherd | Feb. 14, 1950 |
| 2,511,766 | Brailsford | June 13, 1950 |